United States Patent [19]

Vittot et al.

[11] Patent Number: 5,051,821
[45] Date of Patent: Sep. 24, 1991

[54] LOW LIGHT LEVEL COLOR IMAGE TELEVISION SYSTEM INCLUDING ELECTRONIC CONTRAST ENHANCEMENT SYSTEM

[75] Inventors: Michel Vittot, Villecresne; Michèle Fouassier, Yerres, both of France

[73] Assignee: U.S. Philips Corp., New York, N.Y.

[21] Appl. No.: 662,386

[22] Filed: Feb. 26, 1991

Related U.S. Application Data

[63] Continuation of Ser. No. 563,736, Aug. 3, 1990, abandoned, which is a continuation of Ser. No. 369,565, Jun. 2, 1989, abandoned.

[30] Foreign Application Priority Data

Jun. 24, 1988 [FR] France .................. 88 08505

[51] Int. Cl.⁵ .......................................... H04N 1/46
[52] U.S. Cl. ........................................ 358/81; 358/82; 358/110; 358/211
[58] Field of Search ............... 358/81, 82, 110, 113, 358/221, 109, 93

[56] References Cited

U.S. PATENT DOCUMENTS

| | | |
|---|---|---|
| 3,571,504 | 3/1971 | Kiucuhi et al. . |
| 3,748,471 | 7/1973 | Ross et al. . |
| 3,806,633 | 4/1974 | Coleman .................. 358/81 |
| 3,971,068 | 7/1976 | Gerhardt et al. . |
| 4,016,597 | 4/1977 | Dillon et al. .............. 358/113 X |
| 4,170,987 | 10/1979 | Anselmo et al. .......... 358/81 X |
| 4,403,251 | 9/1983 | Domarenok et al. . |
| 4,574,197 | 3/1986 | Kliever .................... 358/113 X |
| 4,608,597 | 8/1986 | Jaeger .................... 358/113 |
| 4,672,439 | 6/1987 | Florence et al. .......... 358/113 |
| 4,717,952 | 1/1988 | Kohayakawa et al. ...... 358/113 |
| 4,751,571 | 6/1988 | Lillquist ................... 358/113 |

FOREIGN PATENT DOCUMENTS 2168427 8/1973 France .

OTHER PUBLICATIONS

IBM Technical Disclosure Bulletin, vol. 13, No. 3, Aug. 1970, pp. 612-613.

*Primary Examiner*—Victor R. Kostak
*Attorney, Agent, or Firm*—William L. Botjer

[57] ABSTRACT

Low light level television system to detect the nocturnal light reflected from objects, comprising a main channel and acting on an extended range of wavelengths, provided with a low light level pick-up or detector tube, and a color channel, acting on a limited range of wavelengths, intended to bring forth the color for the formation of color images on a television monitor. The color channel includes an optical filter, which optical filter eliminates the infrared part of the reflected nocturnal light spectrum, a further low light level pick-up or detector tube, an electronic filter acting on the signal supplied by this further pick-up tube, the two tubes being placed side-by-side and being synchronized. The main and the color channels each act on a color channel of the monitor. The electronic filter provides a temporal integration over several fields. A processing circuit can combine the signals coming from the main and the color channels to act on a third color channel of the monitor.

9 Claims, 2 Drawing Sheets

LOW LIGHT LEVEL COLOR IMAGE TELEVISION SYSTEM INCLUDING ELECTRONIC CONTRAST ENHANCEMENT SYSTEM

This is a continuation of application Ser. No. 563,736, filed Aug. 3, 1990, now abandoned, which is a continuation of Ser. No. 369,565 filed June 21, 1989, now abandoned.

BACKGROUND OF THE INVENTION

The invention relates to a low light level television system having a first channel which detects the nocturnal light reflected by objects in the visible spectrum and in the near infrared (400 nm to approximately 1000 nm) and a second channel which detects another part of the spectrum, each channel including a low light level picture pick-up or detector tube and an input lens adapted to the range of the detected wavelength, the sensitivity range of the first channel being determined by the sensitivity of the photocathode of the detector tube, the signals of the two channels being combined to produce an image on a television monitor.

An invention of this type is disclosed in the document FR 2168427. Such a system includes two channels which operate over different wavelength ranges: one channel extends from 400 nm to 900 nm and the other channel in the thermal infrared (transmission). The two channels are each provided with a lens adapted to the transferred wavelength and two detectors adapted to the wavelength ranges. The signals supplied by each channel are combined in a cathode-ray tube.

In the case of low light level imaging there is a need for devices of small bulk, of low cost, and which are portable, for manufacture for uses by the general public such as the monitoring of premises. The thermal infrared detectors are too expensive for this type of usage and other solutions must be looked for. When the thermal infrared detector is omitted, an apparatus is obtained which operates with one colour only (grey level to show the objects and their contour). In such a system, to obtain the best possible degree of detection and to enable the recovery of an image which is perceptible even at very low light levels ($E < 10^{-5}$ lux) corresponding to the darkest nights, photocathodes are used which have the highest spectral sensitivity range, especially towards the near infrared, for example photocathodes S25 or photocathodes made of GaAs and having the high sensitivity. Actually, in the near infrared the radiation of objects is better than in the visible range. In spite of that, the detection of certain objects might become difficult by lack of contrast between certain materials. In the case, for example, of vegetation and concrete, their coefficients of reflection as a function of the wavelength are different. The vegetation reflects approximately 10% in the visible and approximately 60% in the near infrared, whilst the concrete reflects approximately 30% along the overall spectrum. There is consequently an inversion of contrast towards the centre of the spectral domain of the sensitivity of photocathodes S25 near 700 nm approximately. With such a photocathode, the vegetation and the concrete give the same photocathode current, so the same luminance on the display screen: the contrast between these two materials will seem to be zero or very weak.

A purely optical approach to recover the intensified and coloured images, has been proposed by H. MULDER in "Advances in Electronics and Electronics physics—6th symposium on photoelectronic image devices—London 1976 Vol. 40A page 33". The article describes an image intensifying system with direct vision. The spectrum is separated into two parts, an infrared part whose wavelengths are significantly higher than approximately 700 nm and a visible part in which the wavelengths are significantly less than 700 nm. Each part of the spectrum is separately intensified and is recovered into specific colours, for example green for the near infrared, and red for the visible light. Thus, with such a dichrome system the vegetation transmitting more in the infrared will be seen as green whilst the concrete will be seen as brown (a mixture of green and red). The contrast between these two materials will then be provided by a colour difference and these differences are then identified.

Such a dichrome system utilizes one single tube and separates the spectrum into two distinct parts by means of a dichroic mirror. Such a dichrome system has the advantage that each half of the tube receives only a portion of the phototonic spectrum, so less photones than in a monochrome system, which results in a relative increase in noise, consequently in a deterioration of said detectability of each channel.

SUMMARY OF THE INVENTION

The problem posed by the invention is to improve the detectability of a low light level television system by having the disposal of a proper contrast without increasing the noise in the image so as to obtain an appropriate ease of observation of the image and to enable a rapid perception by the observer.

The solution of the problem posed consists in that the second channel also detects the light reflected from the objects in a wavelength range formed by the visible part (400 nm to 700 nm approximately) of the spectrum of the first channel, this sensitivity range of the second channel included in the sensitivity range of the first channel rendering it possible to improve the contrast and the noise of the image, the two tubes being positioned side-by-side so as to have the two images coincide and being provided with two electronic control and synchronous output circuits, the monitor being a colour television monitor, the first and second channels each acting on one of the colour input channels of the monitor to recover their information components via different combined colours in accordance with a single coloured image.

The first channel (the main channel) corresponds to a high-performance black and white apparatus capable of producing an image of a good resolution and with a good signal-to-noise ratio.

Preferably, the low light level pick-up tubes include an image intensifier tube which is coupled to an image sensor charge transfer device, for example of the type described in the article by M. Lemomier et al. in OPTO 82 PARIS-16-18 November 1982, pp. 85 to 87. The image intensifier tube of the second channel (colour channel) may comprise a bialkaline photocathode or a trialkaline photocathode of the type S25, which has a sensitivity adapted to the wavelength range limited by an optical filter. The wavelength range may be limited by the photocathode itself or by the optical filter.

According to the invention, the detectability of a low light level television system can be improved by adding the colour channel which introduces the colour contrast and increases the quantity of the overall light received at the input. The video signal of the colour channel is processed such as to reduce the noise of the intensifier tube. Actually, this tube receives less photons than the tube in the main channel, as the spectral band is narrower, the spectral sensitivity is weaker and the coefficients of reflections are not so high. In these conditions the shot noise (or photone noise) and also the gain fluctuations caused by the flat array of microchannels produce signal noise which should advantageously be reduced by clipping and/or by integration. Thus the parasitics caused by the ion return in the intensifier tube which would result in very distrubing, very bright pulses are eliminated. To that end an electronic filter clips the strong parasitic pulses produced by the image intensifier tube. The electronic filter may produce a time integration over a plurality of consecutive fields without degrading the image resolution obtained in the main channel.

Thus, in accordance with the invention, the television system proposed renders it possible to obtain on the main channel which has an extended spectrum, the maximum degree of information about the image with a maximum of detection (linked to the sensitivity of the photocathode), a maximum of resolution and a minimum of noise, and to obtain in the colour channel additional information about the contrast between the materials by the colour contribution: this channel causes area colouring but does not determine neither the spatial information nor the temporal information which is provided by the main channel. The two channels must be in synchromism.

If a three-colour monitor tube is used, it is possible for the television system to include a processing circuit which combines the signals coming from the main channel and the signals coming from the colour channel and which acts on a third gun of the colour television monitor. The image contrast thus obtained is then improved still further. The processing circuit may include a control circuit which renders it possible to display a reference on the screen.

BRIEF DESCRIPTION OF THE DRAWINGS

The invention and how it can be put into effect will be better understood with reference to the accompanying Figures, which are given by way of non-limitative example and show.

DETAILED DESCRIPTION OF THE PREFERRED EMBODIMENTS

Figure 1:
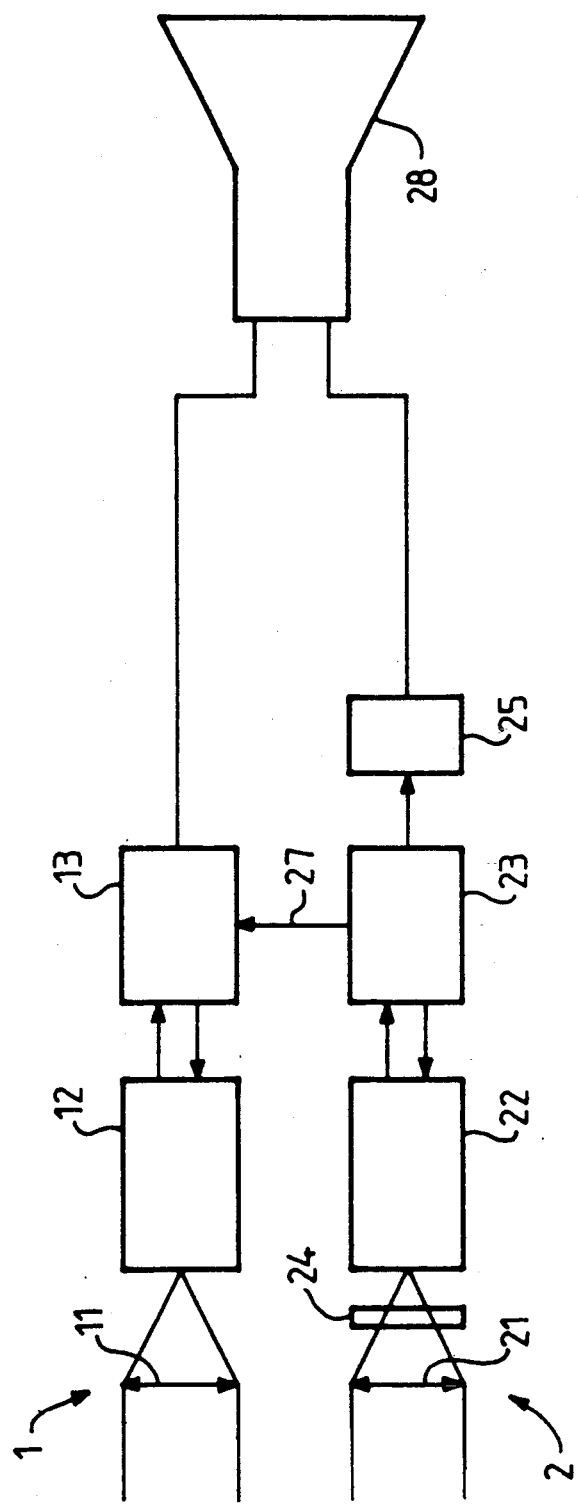
FIG. 1: a low light level television system in accordance with the invention.

In FIG. 1, a main channel 1 includes an input lens 11 which focuses the incident beam on the input of a pick-up or detector tube 12 which receives control signals and applies a video signal to an electronic control and output circuit 13. A colour channel 2 which introduces the colour includes an input lens 21 which is followed by an optical filter 24, both being provided so as to ensure that the incident beam is focused on the input of a pick-up or detector tube 22 which receives the control signals and applies a video signal to an electronic control and output circuit 23. The optical filter is adapted to the photocathode characteristics. The circuits 13 and 23 are brought in synchronism with each other via a connection 27. The output signal of the circuit 23 is fed into an electronic filter 25 which effects clipping and/or temporal integration. The two channels 1 and 2 supply video signals which each act on a different gun of a colour monitor 28. The optical filter 24 removes the infrared part of the reflected nocturnal light spectrum situated at wavelengths higher than approximately 700 nm. The input lenses 11, 21 have a large opening of approximately f/1 and are very powerful. The pick-up tubes 12, 22 are provided with image intensifier 12, 22 tubes which have a high sensitivity (50 mA/W near 800 nm and 500 nm, respectively) and a high resolution (for example better than approximately 30 pairs of lines per mm and 4% of contrast for a sensitive surface diameter of 18 mm).

Optically, the two channels 1 and 2 are juxtaposed, that is to say that the pick-up tubes and their lenses are positioned side-by-side. In this way each channel processes the total amount of received light via its input lens.

Table I shows in arbitary units luminous flux values on the two channels for vegetation and concrete.

TABLE I

|  | main channel with extended spectrum | channel with filtered spectrum | channel ratio |
| --- | --- | --- | --- |
| vegetation | 13 600 | 1 800 | 7,55 |
| concrete | 12 400 | 4 700 | 2,64 |
| contrast | 4,6% | 44,6% |  |

This Table shows that for the main channel with extended spectrum the contrast C between these materials is almost zero:

$$C = \frac{13\,600 - 12\,400}{13\,600 + 12\,400} = 4,6\%$$

In contrast thereto, for the channel with filtered spectrum the contrast is considerable.

$$C = \frac{4\,700 - 1\,800}{4\,700 + 1\,800} = 44,6\%$$

If the colour channel is compared with the main channel, it will be seen that for the vegetation the quantity of light is divided by 7.55, that is to say that the signal-to-noise ratio S/N is divided by 2.75. For concrete, the quantity of light is divided by 2.64, that is to say that S/N is divided by 1.62. The ratio S/N of the filtered channel is consequently significantly less good than that of the main channel. To improve the ratio, the video signal is processed by the electronic filter 25.

For the colour contrast there is a ratio of 7.55 for the vegetation and a ratio of 2.64 for the concrete between the two channels. If the main channel acts on the green gun of the monitor and the filtered channel acts on the red gun of the monitor, the vegetation will then appear to be 7.55 times more green than red, whereas the concrete will be a mixture of green and red (ratio 2.64). Balancing the green and red channels can be modified by controlling the monitor itself.

Figure 2:
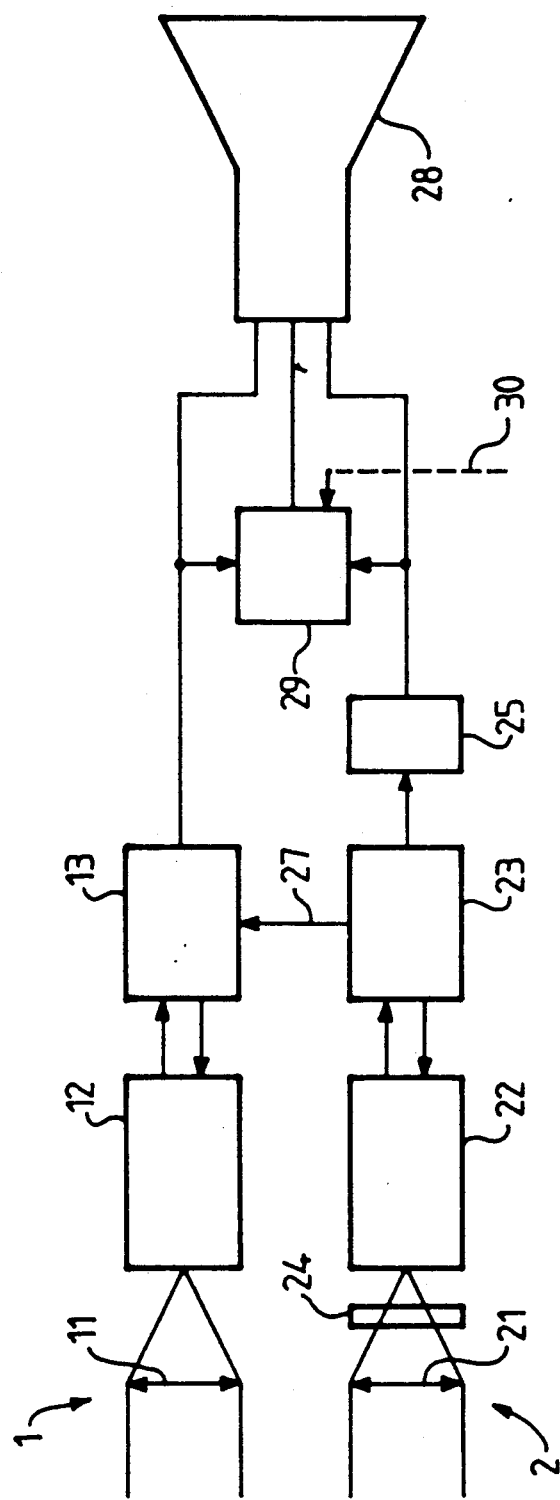
FIG. 2: a system similar to that of FIG. 1, provided additionally with a processing circuit.

FIG. 2 shows the television system with an additional processing circuit 29 for combining the signals coming from the two channels. The other elements are given the same reference numerals. This combination may consist in taking, for example, an average, or a weighted sum of the signals coming from the two detection channels or any more elaborate combination of these two channels which allow the contrast of the displayed image to increase. The output of the circuit 29 acts on the third colour channel of the monitor 28. It is thus possible to change the gamut of colours of the observed image or to reinforce the contours. It is alternativelyly possible to display references whose coordinates can be introduced via the input 30. All this information coming from this combination which will add together on the screen, contribute towards ensuring that the image has a better contrast and a greater ease of observation. These improvements increase the detectability of the system and details contained in the intensified image can be perceived much faster.

The invention is described as having a monitor using a cathode-ray tube but any other colour display device can be used.

We claim:

1. A low light level television system having a first channel which detects the nocturnal light reflected by objects in the visible spectrum and in the near infrared (400 nm to approximately 1000 nm) and a second channel which detects another part of the spectrum, each channel including a low light level picture pick-up or detector tube and an input lens adapted to the range of the detected wavelength, the sensitivity range of the first channel being determined by the sensitivity of the photocathode of the detector tube, the signals of the two channels being combined to produce an image on a television monitor, characterized in that the second channel also detects the light reflected from the objects in a wavelength range formed by the visible part (400 nm to approximately 700 nm) of the spectrum of the first channel, this sensitivity range of the second channel included in the sensitivity range of the first channel rendering it possible to improve the contrast and the noise of the image, the two tubes being positioned side-by-side so as to have the two images coincide and being provided with two electronic control and synchronous output circuits, the monitor being a colour television monitor, the first and second channels each acting on one of the colour input channels of the monitor to recover their information components via different combined colours in accordance with a single coloured image.

2. A system as claimed in claim 1 characterized in that the visible sensitivity range (400 nm to 700 nm approximately) of the second channel is determined by the sensitivity of the photocathode of the detector tube.

3. A system as claimed in claim 1 characterized in that the visible sensitivity range (400 nm to 700 nm) of the second channel is determined by an optical filter.

4. A television system as claimed in claim 1, characterized in that the two low light level pick-up tubes include an image intensifier tube which is coupled to an image sensor charge transfer device.

5. A television system as claimed in claim 1, characterized in that the tube of the second channel includes a trialkaline photocathode of the type S25 or a bialkaline photocathode.

6. A television system as claimed in claim 1, characterized in that it includes an electronic filter which clips the srong parasitic pulses supplied by an image intensifier tube of the second channel.

7. A television system as claimed in claim 6, characterized in that the electronic filter provides a temporal integration over several consecutive fields.

8. A television system as claimed in claim 1, characterized in that it includes a processing circuit which combines the signals coming from the two channels so as to act on a third colour channel of the television monitor.

9. A television system as claimed in claim 8, characterized in that the processing circuit has an input by means of which it is possible to display a reference on the screen.

* * * * *